(12) United States Patent
Sewell et al.

(10) Patent No.: US 10,119,246 B2
(45) Date of Patent: *Nov. 6, 2018

(54) VEHICLE WITH NON-SYMMETRICAL DRIVE MEMBERS

(71) Applicant: The Charles Machine Works, Inc., Perry, OK (US)

(72) Inventors: Cody L. Sewell, Perry, OK (US); Brant Douglas Kukuk, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,737

(22) Filed: Aug. 17, 2017

(65) Prior Publication Data
US 2017/0342682 A1    Nov. 30, 2017

Related U.S. Application Data

(63) Continuation of application No. 14/458,002, filed on Aug. 12, 2014, now Pat. No. 9,739,034.

(60) Provisional application No. 61/864,740, filed on Aug. 12, 2013.

(51) Int. Cl.
| | |
|---|---|
| *E02F 3/10* | (2006.01) |
| *E02F 9/02* | (2006.01) |
| *E02F 5/06* | (2006.01) |
| *E02F 3/08* | (2006.01) |
| *E02F 3/16* | (2006.01) |
| *E02F 5/14* | (2006.01) |
| *B62D 11/00* | (2006.01) |

(52) U.S. Cl.
CPC .............. *E02F 9/02* (2013.01); *B62D 11/001* (2013.01); *E02F 3/083* (2013.01); *E02F 3/088* (2013.01); *E02F 3/16* (2013.01); *E02F 5/06* (2013.01); *E02F 5/145* (2013.01)

(58) Field of Classification Search
CPC ....... A01B 33/028; A01B 33/16; A01B 51/02; A01B 79/02; B62D 55/075; B62D 55/14; B62D 55/12; B62D 55/10; B62D 55/06; B62D 55/286; B62D 11/001; E02F 5/14; E02F 5/06; E02F 3/10; E02F 3/083; E02F 3/146; E02F 3/145; E02F 9/02; E02F 5/145; E02F 3/088; E02F 3/16
USPC ...... 37/142.5, 352, 355, 357, 366, 367, 462, 37/465; 172/40, 42, 107; 180/8.1, 9.1, 180/9.32, 9.62, 19.1, 19.2, 19.3, 9.26, 180/9.48, 9.58; 280/5.22, 5.28
See application file for complete search history.

(56) References Cited

U.S. PATENT DOCUMENTS

| | | | |
|---|---|---|---|
| 5,228,221 A | 7/1993 | Hillard et al. | |
| 5,435,405 A * | 7/1995 | Schempf ................... | B08B 9/08 180/9.1 |

(Continued)

*Primary Examiner* — Robert E Pezzuto
(74) *Attorney, Agent, or Firm* — Tomlinson McKinstry, P.C.

(57) ABSTRACT

A vehicle having a long track or wheel-trail wheel combination on one side and a smaller ground engaging member, such as a short track or wheel on the other. The vehicle has a work attachment on one end of as frame, which is provided clearance on the side of the vehicle with the short track or wheel. A control system is provided to allow an operator to properly control a direction of the vehicle despite the fact that different forces may be required to operate the long track and the short track or wheel.

18 Claims, 4 Drawing Sheets

(56) References Cited

U.S. PATENT DOCUMENTS

| | | | |
|---|---|---|---|
| 6,263,989 B1* | 7/2001 | Won | B25J 5/005 180/8.7 |
| 6,338,209 B1 | 1/2002 | McClure | |
| 7,348,747 B1 | 3/2008 | Theobold et al. | |
| 7,600,592 B2 | 10/2009 | Goldenberg et al. | |
| 7,644,524 B2 | 1/2010 | Azure et al. | |
| 7,753,155 B2* | 7/2010 | Snyder | B62D 55/065 180/190 |
| 8,100,205 B2* | 1/2012 | Gettings | B62D 55/075 180/9.1 |
| 8,113,306 B2 | 2/2012 | Mass et al. | |
| 8,256,542 B2 | 9/2012 | Couture et al. | |
| 8,333,256 B2* | 12/2012 | Stolkin | B62D 55/075 180/6.7 |
| 8,430,188 B2 | 4/2013 | Hansen | |
| 8,875,815 B2* | 11/2014 | Terrien | B25J 5/005 180/65.1 |
| 9,248,875 B2 | 2/2016 | Wolf et al. | |

\* cited by examiner

VEHICLE WITH NON-SYMMETRICAL DRIVE MEMBERS

CROSS REFERENCE TO RELATED APPLICATION

This application is a continuation of U.S. patent application Ser. No. 14/458,002 filed Aug. 12, 2014 and claims the benefit of U.S. Provisional Patent Application Ser. No. 61/864,740, filed on Aug. 12, 2013, the entire contents of which are incorporated herein by reference.

FIELD

The present invention relates generally to the field of skid-steer work vehicles, such as trenchers or vibratory plows.

SUMMARY

The invention is directed to a work machine having a frame and two and only two endless tracks supporting the frame. Each of the tracks defines a stationary footprint. The stationary footprints are laterally spaced and longitudinally offset relative to the frame. Each of the stationary footprints has a different area.

DETAILED DESCRIPTION

Figure 1:
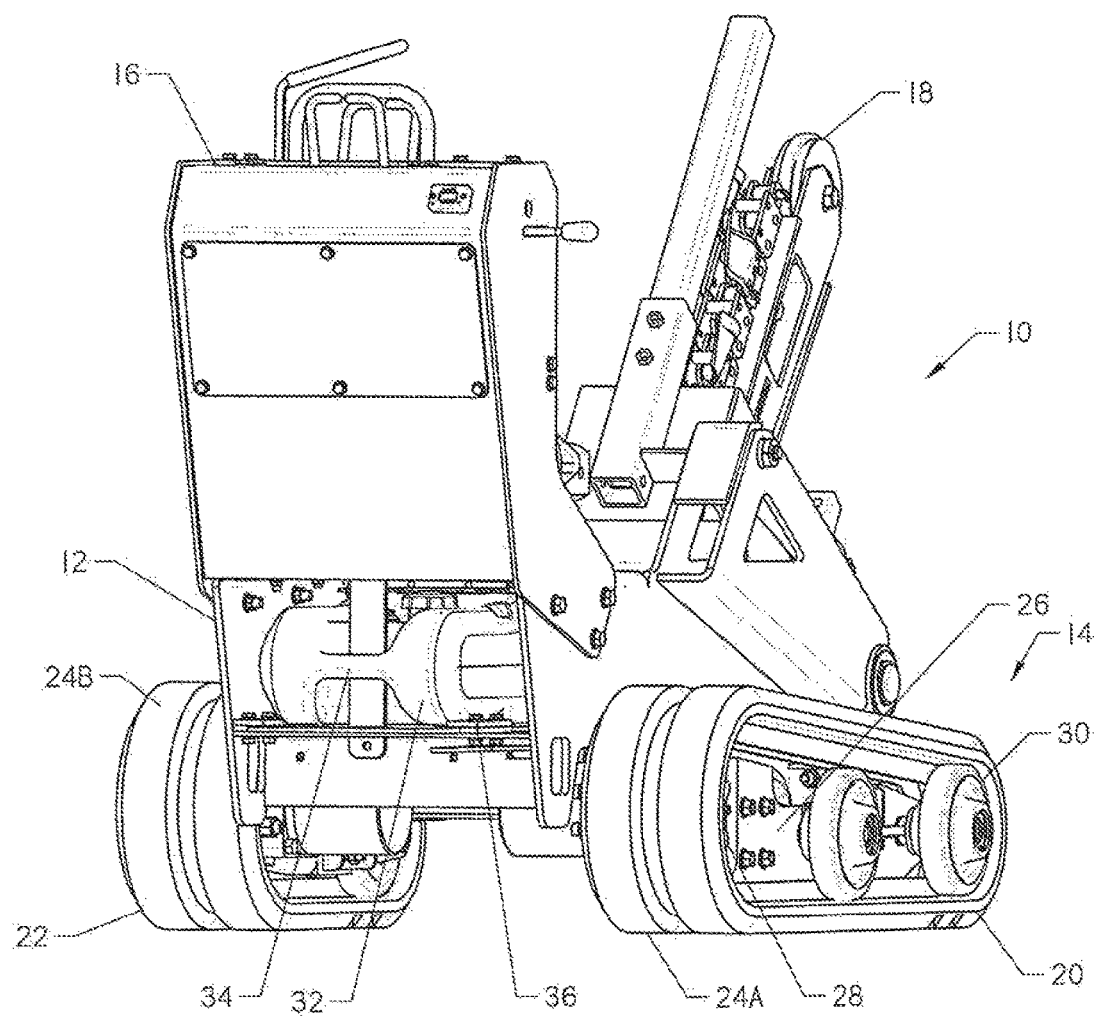
FIG. 1 is a right rear view of the tracked vehicle of the present invention.

With reference now to FIG. 1, shown therein is a vehicle 10 having a frame 12 and a motive force system 14. The frame 12 comprises an operator station 16 and a work attachment 18. The operator station 16 is configured for an operator walking behind the tracked vehicle 10. Ride-on platform and seated operator station 16 configurations are also contemplated. As shown, the work attachment 18 is a trenching boom, but alternative work attachments such as plows, buckets, excavators, microtrenching blades, and others are anticipated. The motive force system 14 comprises a first ground engaging assembly illustrated as a first track system 20 and a second ground engaging member, which is illustrated as a second track system 22. Each of the first track system 20 and the second track system 22 comprise an endless track 24 and a corresponding track support structure 26. The endless track 24 provides a surface-engaging area or contact area between a surface of the ground and the vehicle 10.

A first endless track 24A of the first track system 20 has a larger surface-engaging area between the ground and the endless track than a second endless track 24B of the second track system 22. The overall length of the first and second endless tracks 24A, 24B may differ, or they may be the same, but the contact surface is adjusted by the geometries of the first track system 20 and second track system 22. For example, the first track system 20 may provide for a "low track" while the second track system 22 provides a "high track" having a triangular profile. Alternatively, the first and second track systems 20, 22 may have similar geometries but different lengths, as shown in FIG. 1. The second track system 22 may comprise a surface-engaging area that is 75% or less than the surface-engaging area of the first track system 20. Additionally, the invention could be utilized where the second ground engaging member comprises one or more wheels (not shown) used in place of the second endless track 24B. The endless tracks 24A, 24B may be adjustable to tension the endless tracks about their corresponding track support structure 26.

The track support structure 26 of each track system 20, 22 comprises a drive sprocket 28 and a bogey wheel 30. The drive sprocket 28 is powered by a motor (not shown) to drive the endless track 24A, 24B. The drive sprocket 28 of each track system 20, 22 may be powered by a separate motor. The bogey wheels 30 provide support and shape for the endless track 24A, 24B as it is driven by the sprocket 28.

The vehicle 10 further comprises a fuel tank 32 for storing fuel such as gasoline, diesel, and other liquid fuels for operation of the vehicle and its components. The fuel tank 32 comprises a handle 34 for removal of the fuel tank and storage at a location away from the vehicle 10. A fuel tank tray 36 allows the fuel tank to be removed from the frame 12 for refueling purposes.

Figure 2:
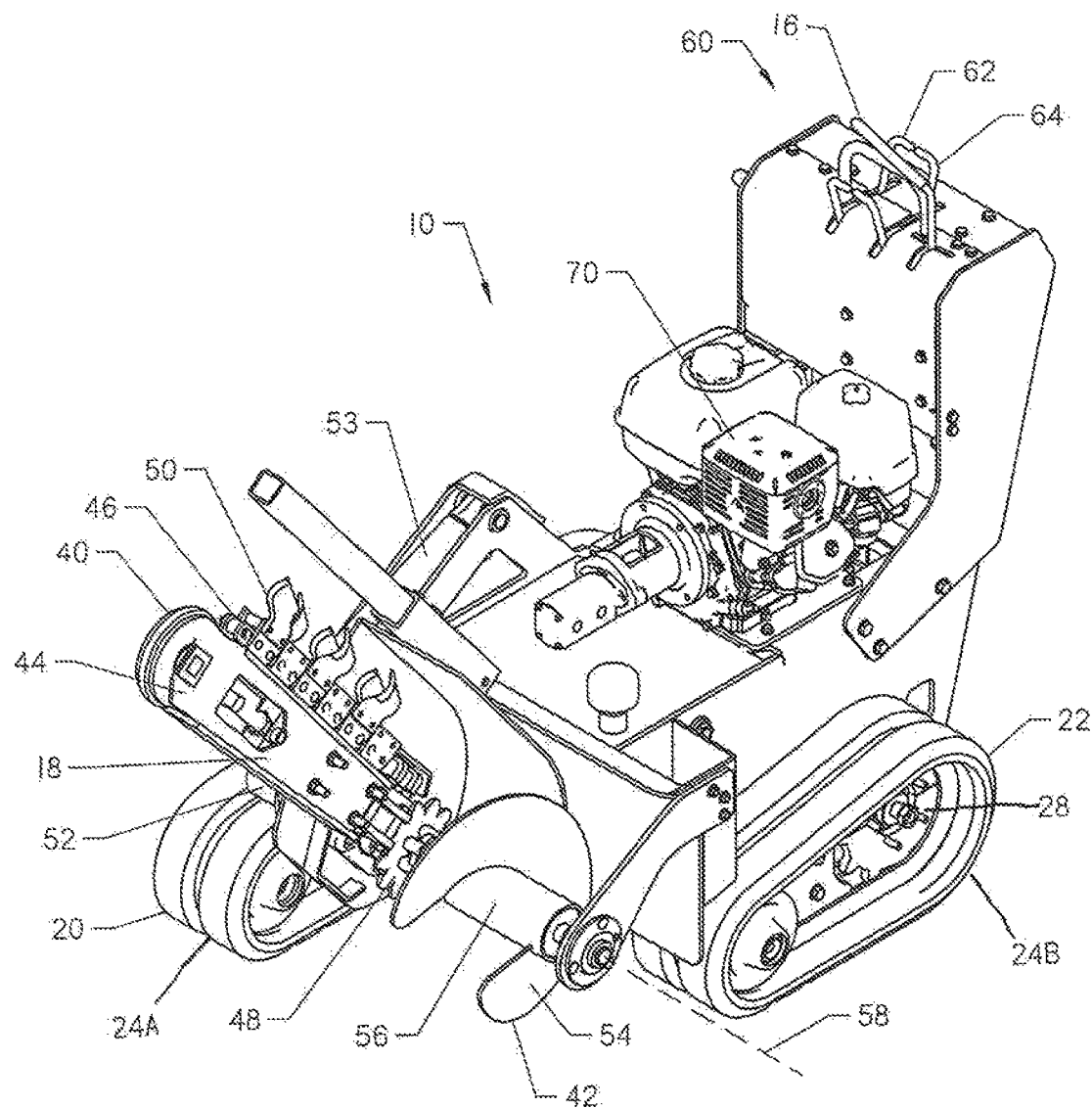
FIG. 2 is a left-front perspective view of the tracked vehicle of FIG. 1.

With reference now to FIG. 2, the vehicle 10 is shown from the side of the second track system 22. The work attachment 18 shown comprises a trencher 40 and auger 42. The trencher 40 comprises a boom 44, an endless digging chain 46, and a sprocket 48. The digging chain 46 comprises a plurality of teeth 50 for digging a trench is when the chain is rotated. The sprocket 48 is powered by a motor 52 and causes the digging chain 46 to rotate about the boom 44. A cylinder 53 is hydraulically powered and controlled at the operator station, and causes the trencher boom 44 to pivot such that the digging chain 46 can engage the ground and create a trench.

The auger 42 is either independently powered or powered by the same motor 52 as the sprocket 48. As shown, the auger 42 comprises a blade 54 and a shaft 56 having an auger axis 58. The blade 54 is attached to the shaft 56 such that rotation of the shaft 56 about the auger axis 58 causes the blade to move spoils from proximate the trencher 40 away from the vehicle 10. The trencher boom 44 may pivot about the auger axis 58 due to operation of the hydraulic cylinder 53. Alternatively, the trencher boom 44 may pivot at a different location. The auger axis 58, when extended in both directions to infinity, will extend above a surface contact area of the first track system 20, but will not extend above a surface contact area of the second track system 22, allowing the auger 42 to remove spoils from proximate a trench created by the trencher 40 but outside of the profile of the vehicle 10.

As shown in FIG. 2, the auger axis 58 and the sprocket 48 are in front of the second endless track 24B but not in front of the first endless track 24A. As the second track structure 22 shown is a "low track" system, the sprocket 28 is located proximate the back of the vehicle 10. One of ordinary skill will appreciate that this sprocket 28 may be placed at any point with a long contact profile with the endless track 24B, and that a "high track" system may have a sprocket at an apex of a triangular profile (not shown).

Controls 60 are provided at the operator station 16 for controlling the track systems 20, 22 and work attachment 18 of the vehicle 10. As shown, the controls 60 comprise a first track throttle 62 and a second track throttle 64. The first track throttle 62 controls the first track system 20, while the second track throttle 64 controls the speed of the second track system 22. One of skill in the art will appreciate that for is track systems 20, 22 of differing lengths to operate at the same speed, a hydraulic control system, gear differential, hydrostatic motors, an electric control system or other means for controlling the throttle (not shown) may be utilized for ease of control of the motive force system 14. For example, when the first track throttle 62 and second track throttle 64 are fully open, the endless tracks 24A, 24B should provide the same motive forces, even if the power required to achieve the force is different for each track.

Alternatively, the controls 60 may comprise a multi-axis joystick (not shown) for controlling the first track system 20 and second track system 22. The multi-axis joystick directs the motive force system 14 to cause the vehicle 10 to move in forward, reverse, or turn based on the two-dimensional actuation of the joystick.

All of the components of the vehicle 10 may be powered by one engine 70 mounted on the frame; however, separate motors may be utilized for each of the work attachment 18, first track system 20 and second track system 22.

Figure 3:
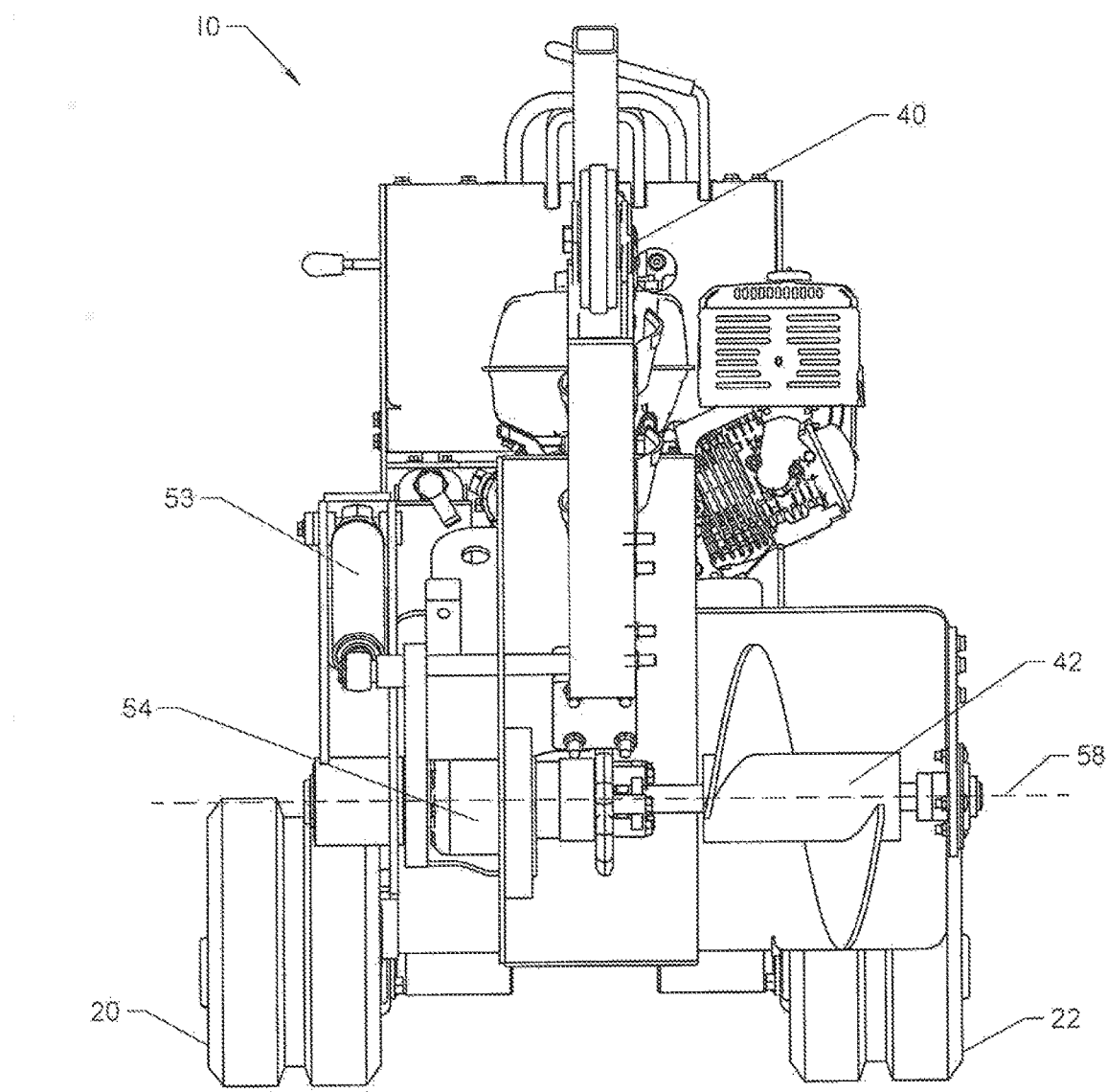
FIG. 3 is a front view of the tracked vehicle of FIG. 1 with the trencher digging chain removed.

With reference now to FIG. 3, the vehicle 10 of FIG. 2 is shown from the front with the digging chain 46 removed so that the auger 42 is clearly shown in front of the second track system 22.

Figure 4:
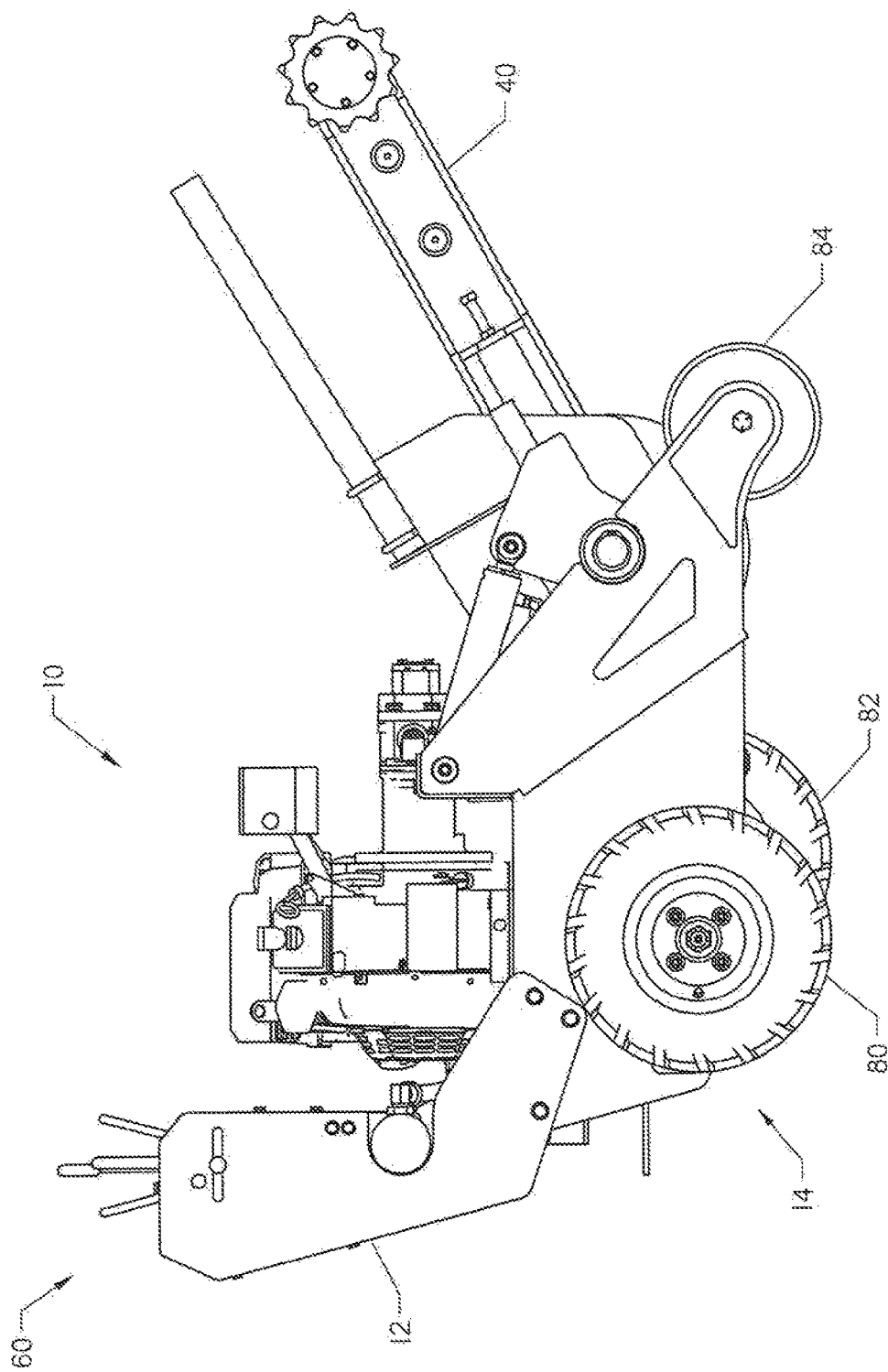
FIG. 4 is a side view of a wheeled vehicle ire accordance with the present invention.

With reference to FIG. 4, a wheeled embodiment of the vehicle 10 is shown therein. The motive force system 14 comprises a first drive wheel 80, a second drive wheel 82, and a roller wheel 84. The first and second drive wheels 82 provide motive force to the vehicle 10. As shown, the first and second drive wheels 80, 82 are the same size and offset relative to the frame 12. Alternatively, the first and second drive wheels 80, 82 may be of differing sizes. The roller wheel 84 is disposed on the same side of the frame as the first drive wheel 80 and provides stability but no motive force. One of ordinary skill can appreciate that an additional drive wheel could be used in place of roller wheel 84. As with respect to the first and second track systems 20, 22 described above, the drive wheels 80, 82 may be powered by separate motors.

Together, first drive wheel 80 and roller wheel 84 form a first ground engaging assembly with a surface contact area greater than the surface contact area of the second drive wheel 82. The auger axis 58 (FIG. 2), when extended in both directions to infinity, will extend above a surface contact area defined by the region where the first ground engaging assembly (the first drive wheel 80 and roller wheel 84) contacts the ground, but will not extend above a surface contact area of the second drive wheel 82, allowing the auger 42 to remove spoils from proximate a trench created by the trencher 40 but outside of the profile of the vehicle 10.

Various modifications can be made in the design and operation of the present invention without departing from the spirit thereof. For example, the first drive wheel 80 and roller wheel 84 of FIG. 4 may be used with the second track system 22 of FIG. 2. Thus, while the principle preferred construction and modes of operation of the invention have been explained in what is now considered to represent its best embodiments, which have been illustrated and described, it should be understood that the invention may be practiced otherwise than as specifically illustrated and described.

The invention claimed is:

1. A vehicle comprising:
a frame having longitudinally offset forward and rear ends and laterally offset first and second sides;
two and only two longitudinally offset and ground-engaging first and second wheels, each wheel mechanically connected to the frame and positioned adjacent the frame's first side;
one and only one ground-engaging third wheel mechanically connected to the frame and positioned adjacent the frame's second side;
an auger supported by the frame at its forward end having an auger axis; and
a trencher supported by the frame at its forward end and configured to discharge material into the auger;
in which the auger is positioned forwardly of the third wheel; and
wherein the third wheel engages the ground rearwardly of the first wheel, and forwardly of the second wheel.

2. The vehicle of claim 1 further comprising a first throttle for actuating rotation of the second wheel, and a second throttle for actuating rotation of the third wheel.

3. The vehicle of claim 2 wherein the first and second throttle are movable to a fully open position, wherein the first ground engaging member moves the frame at the same speed as the second ground engaging member when the first and second throttle are both in the fully open position.

4. The vehicle of claim 1 wherein the first wheel comprises a roller wheel.

5. The vehicle of claim 1 wherein the third wheel and the second wheel are powered by separate motors.

6. A vehicle comprising:
a frame having longitudinally offset forward and rearward ends, laterally offset first and second sides and a stationary footprint;
a movable, endless and ground-engaging first track mechanically connected to the frame, positioned immediately adjacent the frame's first side and having a stationary footprint; and
a movable, endless, and ground-engaging second track mechanically connected to the frame, positioned immediately adjacent the frame's second side and having a stationary footprint;
wherein the stationary footprints of the first and second tracks have differing areas and are situated outside the stationary footprint of the frame.

7. The vehicle of claim 6 further comprising an auger supported by the frame at its forward end and having an auger axis.

8. The vehicle of claim 7 in which the auger axis overlies the stationary footprint of the first track but not the stationary footprint of the second track.

9. The vehicle of claim 7 in which the auger axis is oriented transversely to the frame longitude.

10. The vehicle of claim 7 further comprising a trencher supported by the frame at its forward end and configured to discharge material into the auger.

11. The vehicle of claim 6 further comprising a motor supported by the frame and adapted to drive movement of the tracks.

12. The vehicle of claim 6 wherein the stationary footprint of the first track has 75% or less of the area than the stationary footprint of the second track.

13. A work machine having a frame and two and only two endless tracks supporting the frame, each of the tracks defining a stationary footprint, wherein the stationary footprints are laterally spaced and longitudinally offset relative to the frame, and wherein each of the stationary footprints have a different area.

14. The work machine of claim 13 further comprising a trencher boom supported at a forward end of the frame.

15. The work machine of claim 14 comprising an auger defining an auger axis, wherein the auger axis overlies one and only one of the stationary footprints.

16. The work machine of claim 13 wherein the two endless tracks are each actuated by a discrete track throttle.

17. The work machine of claim 13 wherein the two laterally spaced tracks are actuated by a multi-axis joystick.

18. The work machine of claim 13 wherein at least one of the two laterally spaced tracks is driven rotationally by a sprocket disposed proximate a rear end of the at least one track.

\* \* \* \* \*

UNITED STATES PATENT AND TRADEMARK OFFICE
CERTIFICATE OF CORRECTION

PATENT NO. : 10,119,246 B2
APPLICATION NO. : 15/679737
DATED : November 6, 2018
INVENTOR(S) : Sewell et al.

Page 1 of 1

It is certified that error appears in the above-identified patent and that said Letters Patent is hereby corrected as shown below:

On the Title Page

Item (57), under the Abstract, Line 4, please delete "as" and substitute therefore "its".

In the Specification

Column 1, Line 36, please delete "ire" and substitute therefore "in".
Column 2, Line 31, please delete "is".
Column 3, Line 3, please delete "is".

Signed and Sealed this
Eleventh Day of December, 2018

Andrei Iancu
*Director of the United States Patent and Trademark Office*